United States Patent [19]

Tamagawa et al.

[11] Patent Number: 4,571,630
[45] Date of Patent: Feb. 18, 1986

[54] ELECTRONIC CAMERA HAVING INFORMATION WRITE FUNCTION

[75] Inventors: Akira Tamagawa; Tadashi Kimura; Kazunori Mizokami; Juro Kikuchi; Yutaka Yunoki; Kazuo Nakamura, all of Tokyo, Japan

[73] Assignee: Olympus Optical Co., Ltd., Tokyo, Japan

[21] Appl. No.: 472,070

[22] Filed: Mar. 4, 1983

[30] Foreign Application Priority Data

Mar. 10, 1982 [JP] Japan ................................. 57-36614

[51] Int. Cl.⁴ .......................................... H04N 5/225
[52] U.S. Cl. .................................................. 358/226
[58] Field of Search .............. 358/226, 224, 225, 227, 358/250

[56] References Cited

U.S. PATENT DOCUMENTS 3,578,907  5/1971  Stock ................................... 358/226
3,732,428  5/1973  Spangler .............................. 358/226
3,833,758  9/1974  Ferrari ................................ 358/224

FOREIGN PATENT DOCUMENTS 1187581  4/1970  United Kingdom ................ 358/226

Primary Examiner—Tommy P. Chin
Attorney, Agent, or Firm—Frishauf, Holtz, Goodman & Woodward

[57] ABSTRACT

An electronic camera has a solid-state image pick-up device for picking up an image incident thereon through an imaging lens. The camera has a half mirror interposed between the lens and the image pick-up device, and, at its lower portion, a screen and a lamp for generating an information image. The half mirror transmits the incident image through the lens, and reflects the information image. Both images are synthesized, and a superposed image becomes incident on the image pick-up device.

5 Claims, 9 Drawing Figures

ELECTRONIC CAMERA HAVING INFORMATION WRITE FUNCTION

BACKGROUND OF THE INVENTION

The present invention relates to an electronic camera.

An electronic camera has recently been proposed which uses a solid-state image pick-up device such as a CCD in place of a silver chloride film. In an electronic camera of this type, it is desired that information such as a title, a photographing date, and so on be written on a photographed image. However, an electronic camera with such a function has not yet been proposed.

SUMMARY OF THE INVENTION

It is an object of the present invention to provide an electronic camera which allows a variety of information to be written on a photographed image.

The above object is achieved by an electronic camera comprising an image pick-up device for subjecting to photoelectric conversion an image incident thereon through an imaging lens, an information generating section for emitting an information image corresponding to information to be written, and an optical element which is interposed between the imaging lens and the image pick-up device and which projects the information image from the information generating section onto the image pick-up device.

DETAILED DESCRIPTION OF THE PREFERRED EMBODIMENTS

Figure 1:
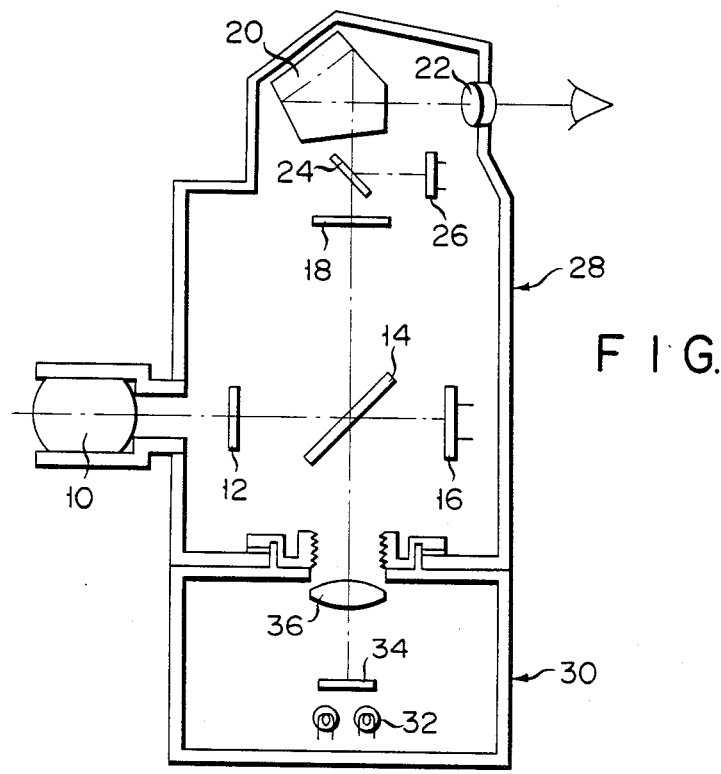
FIG. 1 is a schematic view showing the configuration of an electronic camera according to an embodiment of the present invention.

FIG. 1 is a schematic view showing an electronic camera according to an embodiment of the present invention. An image from an imaging lens 10 becomes incident on a first surface of a half mirror 14 through a shutter 12. Light transmitted through the half mirror 14 is projected onto a solid-state image pick-up device 16 comprising a two-dimensional CCD or the like so as to form an image thereon. On the other hand, light reflected by the half mirror 14 is projected onto a focusing screen 18 so as to form an image thereon. The image formed on the focusing screen 18 may be visually observed through a prism 20 and an eyepiece 22. Another half mirror 24 is interposed between the focusing screen 18 and the prism 20 so as to guide an image on a display unit 26 such as a CRT toward the eyepiece 22. The elements described above are housed inside a camera main body 28.

An information write unit 30 is detachably connected to the lower portion of the camera main body 28. The information write unit 30 has a light source lamp 32, a screen 34, and a lens 36. The screen 34 comprises a transparent film or the like on which information to be written on a photographed image is handwritten, typewritten or printed. When the information write unit 30 is mounted on the camera main body 28, an information image on the screen 34 is projected by the light source lamp 32 and becomes incident on the second surface of the half mirror 14 through the lens 36. Light transmitted through the half mirror 14 forms an information image on the focusing screen 18, while light reflected thereby forms an information image on the solid-state image pick-up device 16. In this manner, the half mirror 14 serves as an optical image synthesizing means for synthesizing an incident image with an information image so as to form the synthesized image on the solid-state image pick-up device 16 and the focusing screen 18. As will be described later, the display unit 26 serves to display an output signal from the image pick-up device 16.

Figure 2:
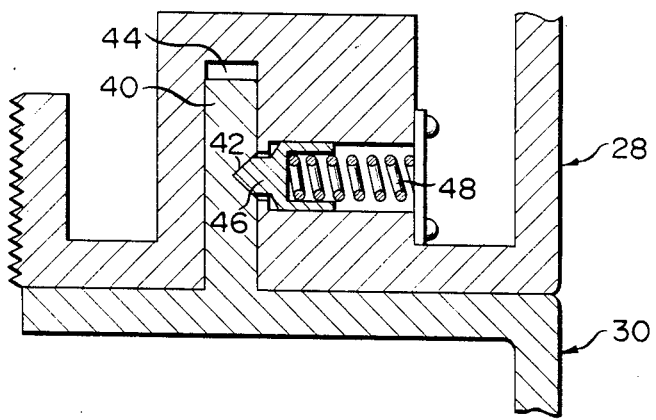
FIG. 2 is an enlarged view showing a part of the camera shown in FIG. 1.

FIG. 2 shows an enlarged view of a mounting portion between the camera main body 28 and the information write unit 30. It is assumed here that the information write unit 30 is vertically detachable from the camera main body 28. A locking pin 40 projects from the upper end surface of the information write unit 30. A conical recess 42 is formed at a position vertically midway along the locking pin 40. A guide groove 44 for receiving the locking pin 40 therein is formed in the lower end surface of the camera main body 28. A locking member 46 for engaging the recess 42 is biased by a spring 48 to project into a position vertically midway along the guide groove 44.

Figure 3:
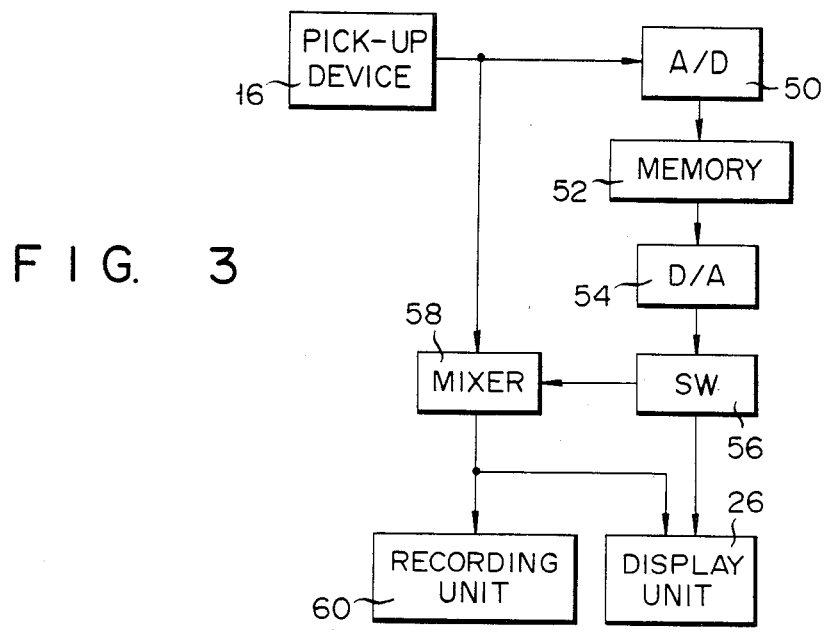
FIG. 3 is a circuit diagram of the camera shown in FIG. 1.

FIG. 3 shows a circuit diagram of the camera according to this embodiment. An output signal from the image pick-up device 16 is supplied to a memory 52 through an A/D converter 50. A readout signal from the memory 52 is supplied to a switch 56 through a D/A converter 54. The switch 56 selectively switches the input signal into two output signals; the first output signal is supplied to the first input end of a mixer 58 while the second output signal is supplied to the display unit 26. An output signal from the image pick-up device 16 is supplied to the second input end of the mixer 58. An output signal from the mixer 58 is supplied to a recording unit 60 and to the display unit 26. The recording unit 60 comprises a bias circuit, a recording head, a recording medium (e.g., a magnetic disc) and the like. The recording unit 60 may be housed inside the camera main body 28 or may be externally attached thereto.

The mode of operation of the camera of this embodiment will now be described. Note that the shutter 12 is normally open to allow observation of an incident image through the eyepiece 22. When the shutter release button is depressed, the shutter 12 is closed temporarily to prepare the image pick-up device 16 for an exposure operation. When the preparation is completed (within several microseconds), the shutter 12 is opened. When the shutter 12 is opened, the light source lamp 32 goes on to illuminate the screen 34. Then, an incident image obtained through the imaging lens 10 is synthesized with an information image projected from the screen 34, and the synthesized image is projected onto the image pick-up device 16 and the focusing screen 18. The shutter 12 is closed within a predetermined time interval after being opened. After a while, the shutter 12 is returned to its normal open state. The amount of light emitted from the light source lamp 32 may be controlled by adjustment of an illumination time or by adjustment of a diaphragm (not shown). Thus, an image signal is obtained from the image pick-up device 16 by photoelectric conversion of the synthesized optical image. The image signal is not written in the memory 52 but is supplied to the recording unit 60 through the mixture 58.

In the above description, the photographing time of an incident image through the imaging lens 10 coincides with the photographing time of an information image produced froom the screen 34. However, these times may differ from each other. For example, it may be desired to write information after a picture is taken. For this purpose, the signal of an incident image is stored in the memory 52. Thereafter, an information signal obtained by the image pick-up device 16 is synthesized by the mixer 58 with a signal read out from the memory 52, and a synthesized signal is supplied to the recording unit 60. It is noted that the shutter 12 is closed during the photographing of the information image. If an output signal from the mixer 58 is supplied to the display unit 26, a synthesized image may be confirmed through the eyepiece 22. Alternatively, information may be written first. In this case, if an information image signal corresponding to an output signal from the memory 52 is supplied to the display unit 26 during the photographing of an incident image, a synthesized image may also be confirmed through the eyepiece 22.

In the above description, the incident image and the information image are superposed on a single frame. However, these images may be separately recorded on different frames, in accordance with this embodiment. For example, after an incident image alone is recorded on a frame, the shutter 12 is closed and the light source lamp 32 is turned on for exposure of the next frame.

In accordance with the first embodiment of the present invention described above, an information write unit 30 is added to an electronic camera having an imaging lens and an image pick-up device, so that an incident image and an information image may be projected onto the image pick-up device through a half mirror. Since the information write unit is in the form of a separate unit, it may be easily mounted on the camera main body. Since the information write unit has a memory, both images may be separately recorded on different frames at different times.

A known means used for a strobe or the like may be used as a means for mounting the information write unit 30 on the camera main body 28.

Figure 4:
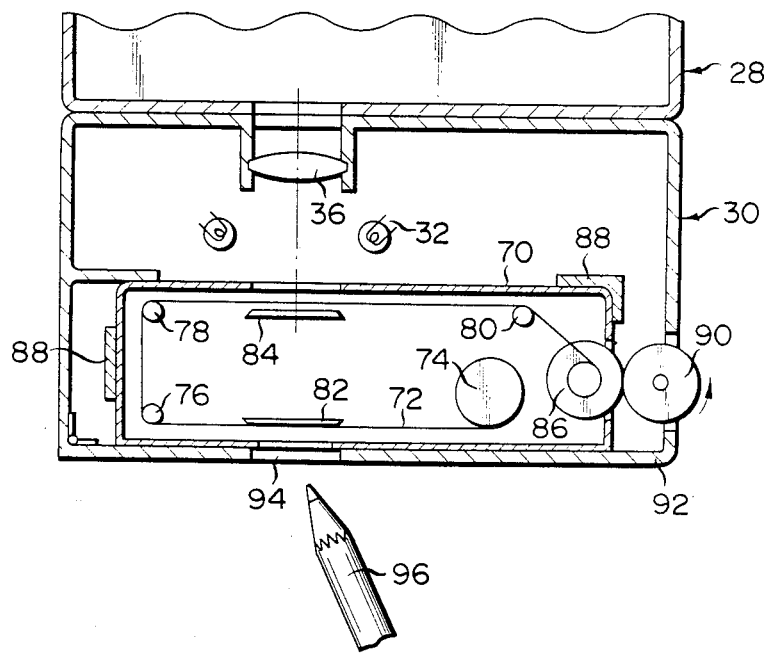
FIGS. 4 to 9 are schematic views showing other embodiments of the present invention.

Another embodiment of the present invention will now be described. The second embodiment shown in FIG. 4 provides a modification of the information write unit 30. The information write unit 30 has a cassette 70. In the cassette 70, one end of a screen 72 is wound around a supply roller 74. The other end of the screen 72 is fixed to a take-up roller 86 by way of guide rollers 76, 78 and 80, and past a pad 82 at an information write position and a reflecting plate 84 at an information photography position. A part of the take-up roller 86 projects outside the side wall of the cassette 70. Therefore, when the cassette 70 is inserted into a guide 88, the take-up roller 86 engages a take-up sprocket 90. A part of the take-up sprocket 90 projects outside the side wall of the information write unit 30. Openings are formed in the cassette 70 corresponding to the information write and photography positions, respectively. When the cassette 70 is inserted into the information write unit 30, a rear lid 92 is closed. Information is written on the screen 72 by a write means such as a pencil 96 through an information write window 94 formed in the rear lid 92. When the information has been written in this manner, the take-up sprocket 90 is rotated to drive the screen 72 so as to bring its recorded or written portion to the information photography position. If the take-up sprocket 90 includes a click mechanism or the like, written information may be brought precisely to the information photography position. In this embodiment, the information written on the screen 72 is reflected by the reflecting plate 84 and is projected onto the half mirror 14 by illumination of the light source lamp 32.

Figure 5:
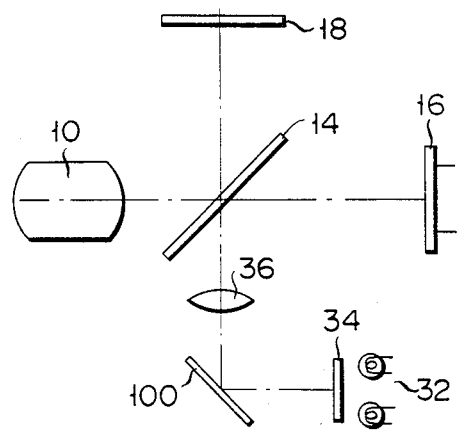

A third embodiment shown in FIG. 5 is the same as the first embodiment except for the arrangement of the light source lamp 32 and the screen 34. In the first embodiment, the light source lamp 32 and the screen 34 are on the optical axis of the lens 36, the half mirror 14 and the focusing screen 18. However, in the third embodiment, the screen 34 and the light source lamp 32 are deviated from the optical axis. The information on the screen 34 is reflected by a mirror 100 and is projected onto the half mirror 14.

Figure 6:
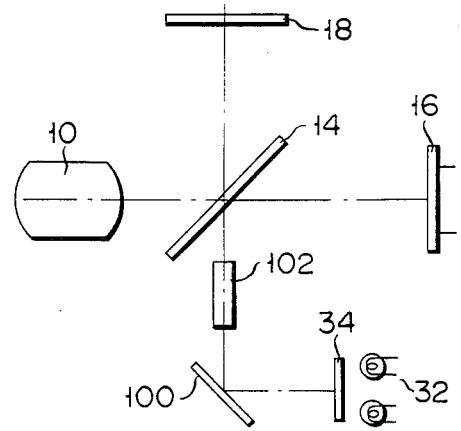

A fourth embodiment shown in FIG. 6 is basically the same as the third embodiment except for the arrangement of the lens 36 for forming an information image. In this embodiment, a distributed index lens 102 is used for this purpose.

In the embodiments shown in FIGS. 5 and 6, an information image need not be a projected image and can be a reflected image obtained with the arrangement shown in FIG. 4.

In the embodiments described above, the information is written on the screen. However, the present invention is not limited to this arrangement.

Figure 7:
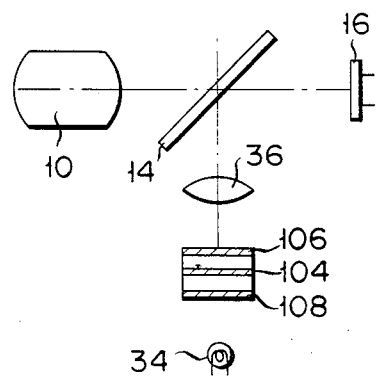
Figure 8:
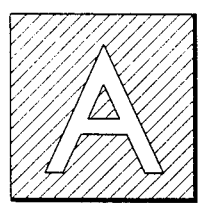
Figure 8:
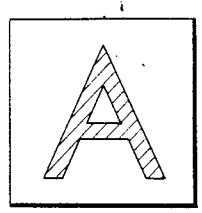

In a fifth embodiment shown in FIG. 7, an LCD 104 may be used in place of the screen. Two information images of inverted contrasts as shown in FIG. 8 may be obtained when polarizing planes of polarizing plates 106 and 108 are aligned or deviated by 90° from each other.

Figure 9:
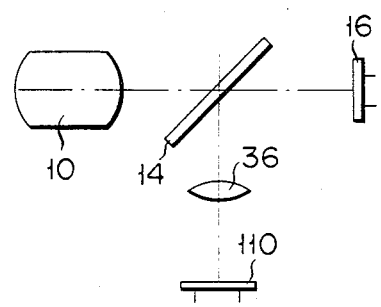

FIG. 9 shows a sixth embodiment wherein an LED 110 is used in place of the screen and the light source lamp.

In the last two embodiments, the information which may be written is limited to predetermined alphanumeric characters or other symbols. Information may be entered in the form of signals through a keyboard or the like.

In summary, the present invention provides an electronic camera which allows information to be written on a photographed image.

What we claim is:

1. A electronic camera having an information write function, comprising:
   an imaging lens;
   image pick-up means for photo-electric converion of an object image incident thereon through said imaging lens;
   information image generating means for emitting an information image corresponding to information to be written with respect to said object image, at a time different from the time when the object image incident on said image pick-up means through said imaging lens is converted by said image pick-up means;
   optical means interposed between said image pick-up means and said information image generating means, for projecting the information image onto said pick-up means; and
   signal mixing means electrically connected to said image pick-up means, for storing an image signal of a first converted one of the object image incident on said image pick-up means through the imaging lens and the information image emitted from said information image generating means, and for mixing the stored image signal and a later converted one of the object image incident on said image pick-up means through the imaging lens and the information image emitted from said information image generating means.

2. An electronic camera according to claim 1, in which said information image generating means is arranged on an axis perpendicular to an optical axis connecting said imaging lens and said image pick-up means, and said optical means comprises a half mirror.

3. An electronic camera according to claim 2, in which said half mirror projects a transmitted image of the incident image and a reflected image of the information image onto said image pick-up means, while a reflected image of the incident image and a transmitted image of the information image are projected onto an eyepiece through a focusing screen and a prism.

4. An electronic camera according to claim 1, in which said information image generating means comprises a lamp and a transparent film on which information is written, the information image being projected from said transparent film illuminated by said lamp.

5. An electronic camera according to claim 1, in which said information image generating means comprises:
- an information write unit arranged to be mounted on a camera main body;
- a screen cassette arranged to be supported within the information write unit and including an elongate screen, a supply roller and a take-up roller for transporting a writing portion of said screen past an information write position, a pad at said information write position on which the information image may be written on said screen, and a reflecting plate adjacent the path of movement of said screen; and
- a light source provided within the information write unit for illuminating said reflecting plate so that an information image written on a portion of said screen which is moved adjacent the reflecting plate, is provided to said optical means.

* * * * *